US012707159B2

(12) United States Patent
Hanwell et al.

(10) Patent No.: US 12,707,159 B2
(45) Date of Patent: Aug. 11, 2026

(54) COLOR FILTER ARRAY IMAGE DATA PROCESSING

(71) Applicant: Arm Limited, Cambridge (GB)

(72) Inventors: David Hanwell, Sale (GB); Ignazio Indovina, Greater Manchester (GB); Maxim Novikov, Cheshire (GB); Jozef Staal, Manchester (GB)

(73) Assignee: Arm Limited, Cambridge (GB)

( * ) Notice: Subject to any disclaimer, the term of this patent is extended or adjusted under 35 U.S.C. 154(b) by 98 days.

(21) Appl. No.: 18/789,077

(22) Filed: Jul. 30, 2024

(65) Prior Publication Data

US 2026/0039969 A1 Feb. 5, 2026

(51) Int. Cl.

| | |
|---|---|
| ***H04N 25/11*** | (2023.01) |
| ***G06T 5/20*** | (2006.01) |
| ***G06T 5/70*** | (2024.01) |
| ***G06T 5/73*** | (2024.01) |
| ***G06T 7/13*** | (2017.01) |
| ***H04N 19/124*** | (2014.01) |
| ***H04N 19/625*** | (2014.01) |

(52) U.S. Cl.

CPC ............... *H04N 25/11* (2023.01); *G06T 5/20* (2013.01); *G06T 5/70* (2024.01); *G06T 5/73* (2024.01); *G06T 7/13* (2017.01); *H04N 19/124* (2014.11); *H04N 19/625* (2014.11)

(58) Field of Classification Search

CPC .... H04N 25/11; H04N 19/124; H04N 19/625; G06T 5/20; G06T 5/70; G06T 5/73; G06T 7/13

See application file for complete search history.

(56) References Cited

U.S. PATENT DOCUMENTS

| | | | | |
|---|---|---|---|---|
| 3,971,065 A * | 7/1976 | Bayer | .................. | H04N 25/134 348/E9.003 |
| 8,179,971 B1 * | 5/2012 | Gough | ................. | H04N 19/625 375/240.18 |
| 2008/0298708 A1 * | 12/2008 | Ovsiannikov | ........ | H04N 23/843 382/266 |

(Continued)

FOREIGN PATENT DOCUMENTS

CN 101335900 A * 12/2008

*Primary Examiner* — Timothy J Henn
(74) *Attorney, Agent, or Firm* — EIP US LLP

(57) ABSTRACT

A method of processing color filter array, CFA, image data comprising receiving CFA image data comprising a plurality of pixel values in a frame of image data representable as a main two-dimensional row-columnar pattern, each pixel value corresponding to a color filter in a CFA. Different pixel values of the plurality of pixel values are associated with respective different filter colors including first pixel values associated with a first filter color and second pixel values associated with a second filter color. The first pixel values are arranged in at least a two-dimensional checkerboard sub-pattern in the main two-dimensional row-columnar pattern. The method involves performing a diagonally-aligned processing operation on the first pixel values, wherein the processing operation operates on the first pixel values in accordance with a reprojected array, the reprojected array corresponding to a reprojection of the two-dimensional checkerboard sub-pattern into a row-columnar array.

19 Claims, 13 Drawing Sheets

(56) References Cited

U.S. PATENT DOCUMENTS

| | | | | |
|---|---|---|---|---|
| 2010/0296587 | A1* | 11/2010 | Rusanovskyy | H04N 19/117<br>375/E7.193 |
| 2012/0250976 | A1* | 10/2012 | Dong | G06T 5/70<br>382/154 |

* cited by examiner

310 Receive

312 Decompander

314 White balancer

316 Denoiser

318 Black level adjuster

320 Tone mapper

322 Sharpener

324 Gamma corrector

326 Demosaicer

328 Output

330 Compression/decompression

COLOR FILTER ARRAY IMAGE DATA PROCESSING

BACKGROUND OF THE INVENTION

Field of the Invention

The present disclosure relates to methods and apparatus for processing color filter array (CFA) image data.

Description of the Related Technology

Image sensors for capturing images may be present in devices such as digital cameras, mobile cameras and other image capturing devices. Typical image sensors used in such devices are able to capture the intensity of light via the use of photosensors, but not the wavelength (therefore color) of the light. To rectify this, the photosensors, which are typically laid out in a two-dimensional row-columnar pattern of photosensor array locations (which may be referred to as photosites), are overlaid with a CFA which allows for the photosensor array to capture color information. CFAs selectively filter the light by wavelength, allowing light of certain wavelength ranges (corresponding to a particular set of colors e.g. red, green and blue (RGB) through to each photosensor. An example of a CFA pattern is the Bayer pattern which contains RGB information with a green bias since there are twice as many green pixels present compared to that of each of red and blue. The Bayer pattern comprises a repeated RGGB (or BGGR, GRBG, GBRG etc.) mosaic. A Bayer pattern includes, for the green pixels, a checkerboard sub-pattern and the red and blue pixels are each arranged in a two-dimensional row-columnar sub-pattern. Note that the checkerboard sub-pattern can itself be expressed as two interspersed two-dimensional row-columnar sub-patterns, occurring every other row and column respectively. Other CFA patterns include a RCCC mosaic, which includes green pixels in a checkerboard sub-pattern and a further set of green and red pixels each of which are arranged in a two-dimensional row-columnar sub-pattern.

Examples of image processing techniques carried out on data from CFAs include blurring, sharpening, denoising, interpolation, embossing and edge detection, achieved through the use of image kernels. Other image processing techniques include image compression, important for the efficient storage and transmission of image data and for the adaptation of digital images for use on specific hardware.

SUMMARY

According to examples of the present disclosure, there is provided a method of processing CFA image data comprising: receiving CFA image data comprising a plurality of pixel values in a frame of image data representable as a main two-dimensional row-columnar pattern, each pixel value corresponding to a color filter in a CFA, wherein different pixel values of the plurality of pixel values are associated with respective different filter colors including first pixel values associated with a first filter color and second pixel values associated with a second filter color, wherein: the first pixel values are arranged in at least a two-dimensional checkerboard sub-pattern in the main two-dimensional row-columnar pattern; and the second pixel values are arranged in a two-dimensional row-columnar sub-pattern in the main two-dimensional row-columnar pattern; performing a diagonally-aligned processing operation on the first pixel values, wherein the processing operation operates on the first pixel values in accordance with a reprojected array, the reprojected array corresponding to a reprojection of the two-dimensional checkerboard sub-pattern into a row-columnar array; and generating output image data resulting from performing said diagonally-aligned image processing operation on the first pixel values.

In examples, there is provided an image signal processor comprising circuitry configured to: receive CFA image data comprising a plurality of pixel values in a frame of image data representable as a main two-dimensional row-columnar pattern, each pixel value corresponding to a color filter in a CFA, wherein different pixel values of the plurality of pixel values are associated with respective different filter colors including first pixel values associated with a first filter color and second pixel values associated with a second filter color, wherein: the first pixel values are arranged in at least a two-dimensional checkerboard sub-pattern in the main two-dimensional row-columnar pattern; and the second pixel values are arranged in a two-dimensional row-columnar sub-pattern in the main two-dimensional row-columnar pattern; perform a diagonally-aligned processing operation on the first pixel values, wherein the processing operation operates on the first pixel values in accordance with a reprojected array, the reprojected array corresponding to a reprojection of the two-dimensional checkerboard sub-pattern into a row-columnar array; and generating output image data resulting from performing said diagonally-aligned image processing operation on the first pixel values.

In examples, there is an imaging system comprising an image sensor; and an image signal processor comprising circuitry configured to: receive CFA image data from the image sensor, the CFA image data comprising a plurality of pixel values in a frame of image data representable as a main two-dimensional row-columnar pattern, each pixel value corresponding to a color filter in a CFA, wherein different pixel values of the plurality of pixel values are associated with respective different filter colors including first pixel values associated with a first filter color and second pixel values associated with a second filter color, wherein: the first pixel values are arranged in at least a two-dimensional checkerboard sub-pattern in the main two-dimensional row-columnar pattern; and the second pixel values are arranged in a two-dimensional row-columnar sub-pattern in the main two-dimensional row-columnar pattern; perform a diagonally-aligned processing operation on the first pixel values, wherein the processing operation operates on the first pixel values in accordance with a reprojected array, the reprojected array corresponding to a reprojection of the two-dimensional checkerboard sub-pattern into a row-columnar array; and generating output image data resulting from performing said diagonally-aligned image processing operation on the first pixel values.

BRIEF DESCRIPTION OF THE DRAWINGS

Further features and advantages will become apparent from the following description, given by way of example only, which is made with reference to the accompanying drawings in which like reference numerals are used to denote like features.

DETAILED DESCRIPTION OF CERTAIN INVENTIVE EMBODIMENTS

Details of examples will become apparent from the following description, with reference to the Figures. In this description, for the purpose of explanation, numerous specific details of certain examples are set forth. Reference in the specification to "an example" or similar language means that a particular feature, structure, or characteristic described in connection with the example is included in at least that one example but not necessarily other examples. It should be further noted that certain examples are described schematically with certain features omitted and/or necessarily simplified for ease of explanation and understanding of the concepts underlying the examples.

Figure 1:
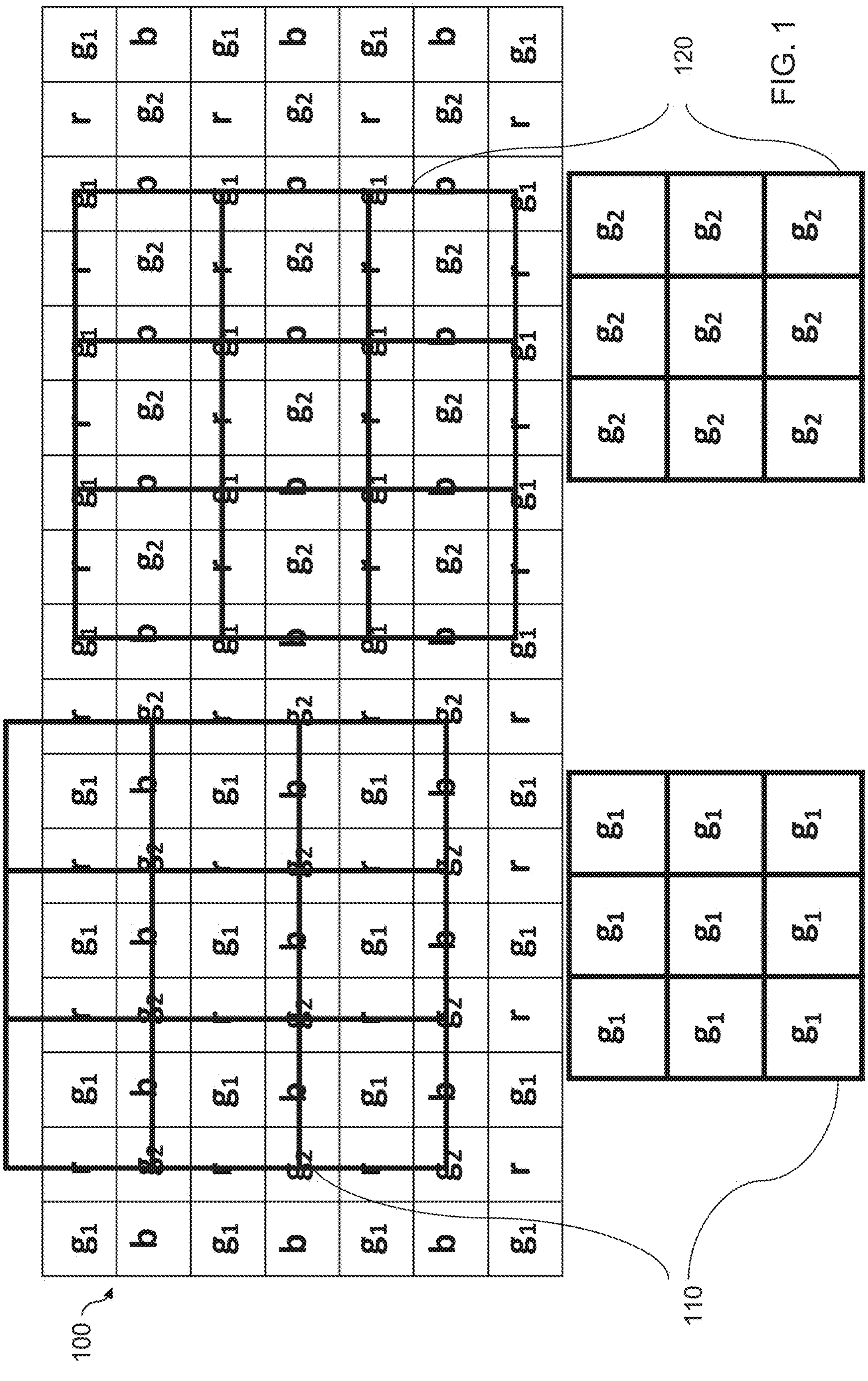
FIG. 1 is a representation of Bayer filter image data.

FIG. 1 shows Bayer pattern image data 100. For context, Bayer image data 100 can be split into a first exemplary 5×5 pixel array 110 containing a 3×3 set of green pixel values $g_1$, and a second exemplary 5×5 pixel array 120 containing a 3×3 set of green pixel values $g_2$. The green pixel values $g_1$ are arranged in a two-dimensional row-columnar sub-pattern and occur in every second column and row in a two-dimensional row-columnar sub-pattern. The green pixel values $g_2$ are arranged in a separate two-dimensional row-columnar sub-pattern and occur in every second column and row in a two-dimensional row-columnar sub-pattern. Thus the checkerboard sub-pattern containing the green pixel values $g_1$ and the green pixel values $g_2$ can be decomposed into two two-dimensional row-columnar sub-patterns occurring in alternating rows and columns of the main pattern. The exemplary pixel arrays 110, 120 may have associated separable kernels configured to use the pixel values in the arrays for filtering operations. A separable kernel allows for a two-dimensional kernel for use in filtering operations to be separated into two one-dimensional kernels, reducing the number of computational operations needed when using a kernel of size K×K from $K^2$ to 2K. A first separable kernel may operate on pixels containing $g_1$ pixel values only and not $g_2$ pixel values. Similarly, a second separable kernel may operate on pixels containing $g_2$ pixel values only and not $g_1$ pixel values. The separable kernels perform filtering operations on $g_1$ and $g_2$ green pixel values separately.

Figure 2:
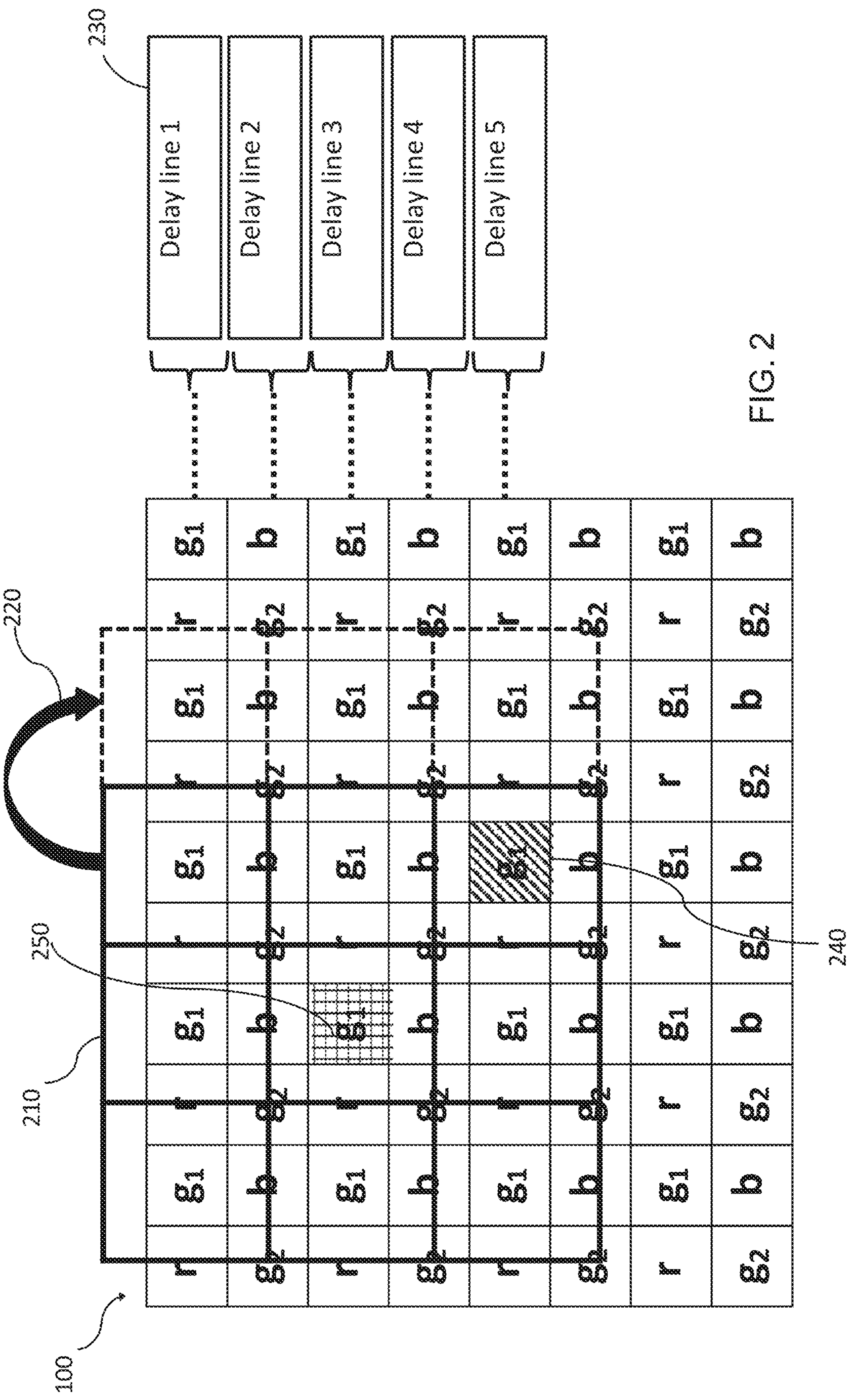
FIG. 2 is a representation of pixel values and associated delay lines for Bayer filter image data.

FIG. 2 shows a use of delay lines 230 on Bayer CFA image data 100. Delay lines ensure storage of lines of pixel values previously read out from the imaging sensor, to allow for filtering operations to be carried out which require pixel values from previous lines. For context, a filtering operation may be performed on the green pixel values contained within 5×5 array 210, namely on a 3×3 set of green pixel values $g_1$. To perform a filtering operation on green pixel values $g_1$ contained within array 210, delay line 1, delay line 3 and delay line 5 are required to store three rows of green pixel values $g_1$. The most recently produced $g_1$ pixel value 240 to be read in before the filtering operation is performed may be received from the image processing pipeline directly or retrieved from delay line 5. In this example, a 3×3 separable kernel is used to perform filtering operations on the green pixel values $g_1$ contained in the array 210, with the current green pixel value $g_1$ 250 being transformed by the filtering operation. Arrow 220 shows the progression of the image processing kernel to perform the next set of filtering operations on the green pixel values $g_1$.

In the context of FIGS. 1 and 2, image processing techniques carried out on Bayer patterns such as filtering operations are handled by using two separate image kernels to process the two different sets of green photosites $g_1$ and $g_2$ in the RGGB mosaic, or by designing custom kernels, not easily separable into vertical and horizontal components.

Examples operate on an array of CFA image data similar to that described in relation to FIG. 1, comprising a plurality of pixel values in a frame of image data representable as a main two-dimensional row-columnar pattern.

Examples operate on a plurality of pixel values where each pixel value corresponds to a color filter in the CFA, the CFA being for example a Bayer pattern. The image data comprises a plurality of pixel values associated with respective different filter colors, including first pixel values associated with a first filter color, which in this example is green, and second pixel values associated with a second filter color, which in this example is red or blue. The input image data may be obtained from a local imaging sensor inside an image capture device, such as a smartphone or a camera. In some examples, the input image data may be captured by a remote image sensor and may be transmitted to be received. For example, a remote imaging device such as a smartphone or a camera may capture image data using an image sensor and the image data may be transmitted over a wide area network, for example the internet, or a local area network via a network interface.

In examples, the green pixel values are arranged in at least a two-dimensional checkerboard sub-pattern within the main two-dimensional row-columnar pattern, and the red and blue pixel values are each arranged in a regular row-columnar sub-pattern within the main two-dimensional row-columnar pattern. The checkboard sub-pattern comprises a sub-pattern in which the pixels in a given row of the sub-pattern are offset into different columns of the sub-pattern from the pixels in an adjacent row of the sub-pattern. The regular row-columnar sub-pattern comprises a sub-patter in which pixels in a given row of the regular row-columnar sub-pattern are aligned to the same columns as the pixels in an adjacent row of the regular row-columnar sub-pattern.

In FIG. 1, the red and blue pixels are labelled with r and b respectively, and the filters comprising the checkerboard sub-pattern for the green pixels are labelled $g_1$ and $g_2$ for each alternating row of the checkerboard sub-pattern.

In examples, processing of CFA image data may occur in an image processing pipeline comprising a plurality of stages, where different filtering operations may operate on the CFA image data at different ones of the plurality of stages. The filtering operations may include denoising, sharpening, blurring, interpolation, edge detection and/or other image processing operations involving the use of an image kernel.

In an example, the image processing pipeline 300 may be implemented in an image signal processor (ISP), however it should be appreciated the image processing pipeline 300 may be implemented in any suitable processor such as a central processing unit (CPU), a graphics processing unit (GPU), a neural processing unit (NPU) or variations and/or combinations thereof.

Figure 3:
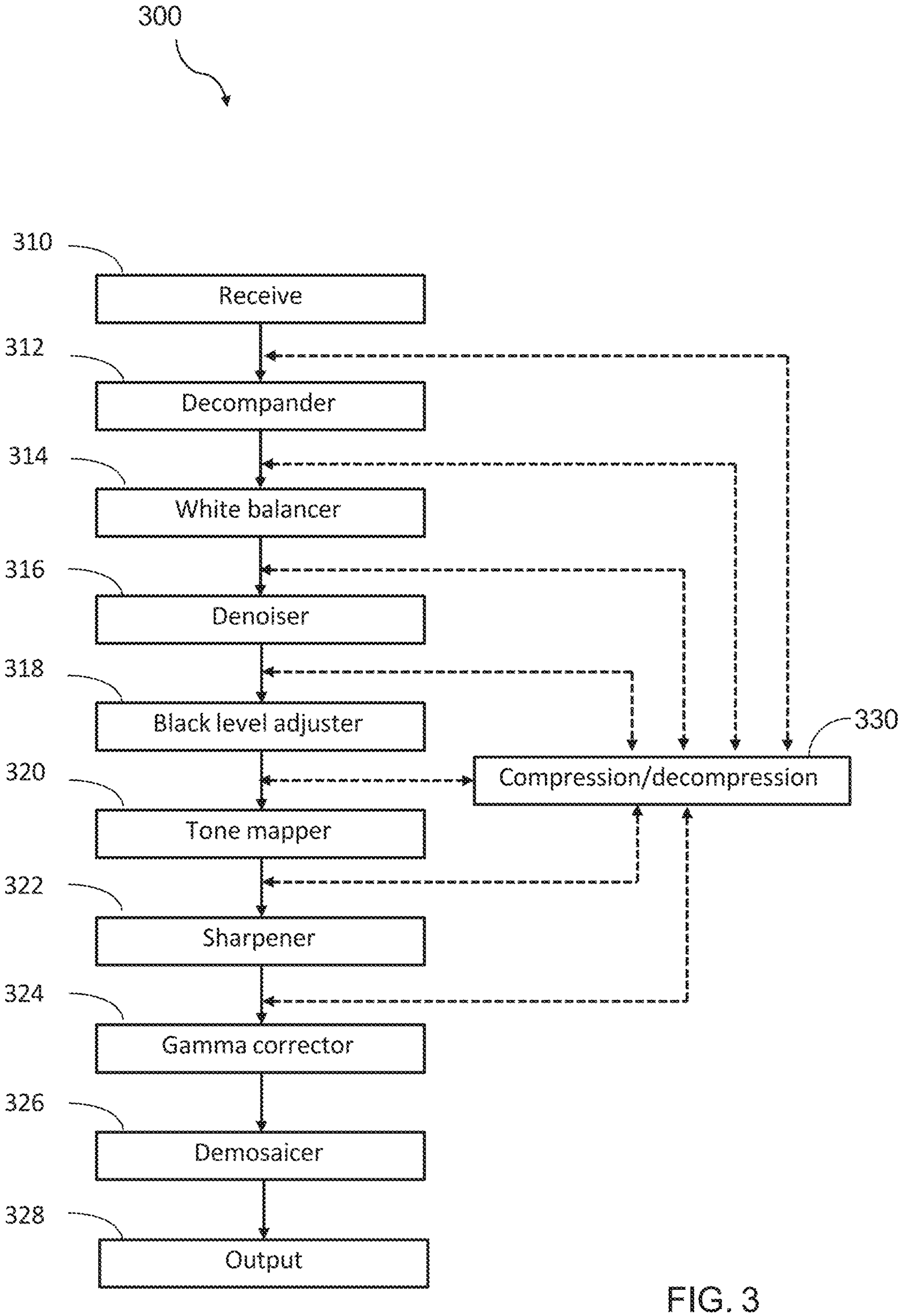
FIG. 3 is a block diagram showing stages of an image signal processing pipeline according to an example.

An example of an image processing pipeline 300 used in an ISP is shown in FIG. 3. Each of the image processing stages on the image processing pipeline 300 may be implemented as individual modules using hardware (e.g., digital signal processors or ASICs) or software, or via a combination of hardware and software components. Many of the stages of the image processing pipeline in FIG. 3 may be carried out using processing operations involving image processing kernels, to be described in further detail with reference to subsequent Figures.

The pipeline includes a receive stage 310 in which input pixel values are received from the image sensor.

Optionally, the image signal processing pipeline may include a decompander stage 312 in which an original dynamic range of an image is restored. Dynamic range is the ratio between the largest and smallest values that luminance values take in an image.

Optionally, the image signal processing pipeline may contain a white balancer stage 314, in which unrealistic color casts are removed from the image data in order to ensure that white objects are rendered white in the digital image.

Optionally, the image signal processing pipeline may contain a denoiser stage 316, in which noise due to factors including poor lighting and temperature of the image sensor is removed from the image data.

Optionally, the image signal processing pipeline may contain a black level adjuster stage 318, in which residual signal from the image signal at zero light level, otherwise known as dark current, is subtracted from the image data.

Optionally, the image signal processing pipeline may contain a tone mapper stage 320, which adjusts the dark/light values of an image with high dynamic range in order for the image to be viewed on digital displays, such that the dynamic range is scaled down while preserving the appearance of the original image.

Optionally, the image signal processing pipeline may contain a sharpener stage 322, in which the definition and clarity of an image are emphasized.

Optionally, the image signal processing pipeline may contain a gamma corrector stage 324, in which the luminance values of an image are adjusted in accordance with human perception of luminance.

In examples, the image signal processing pipeline contains a demosaicer 326. The demosaicing operation constructs a full color image using the information received from the CFA. In examples in which the CFA uses a Bayer filter, each green, red and blue pixel value may be constructed using the other two filter color pixel values for each pixel value corresponding to a filter color in the CFA. The demosaicing operation may be carried out by a number of demosaicing algorithms, including nearest-neighbor interpolation, bilinear interpolation, bicubic interpolation, spline interpolation and Lancoz resampling.

The pipeline includes an output stage 328 in which pixel values are output at the end of the image signal processing pipeline, after having undergone the previous image processing operations.

Optionally, the image signal processor pipeline 300 may be configured to allow for image compression and decompression, including image frame storage, to occur after each of image processing operations 312, 314, 316, 318, 320, 322, 324 and 326, using a compression/decompression module as shown schematically at block 330. Compression/decompression module 330 may operate in accordance with the method of FIG. 8, a method of performing a compression operation on CFA image data according to the various examples illustrated in FIGS. 9 to 12.

Figure 4:
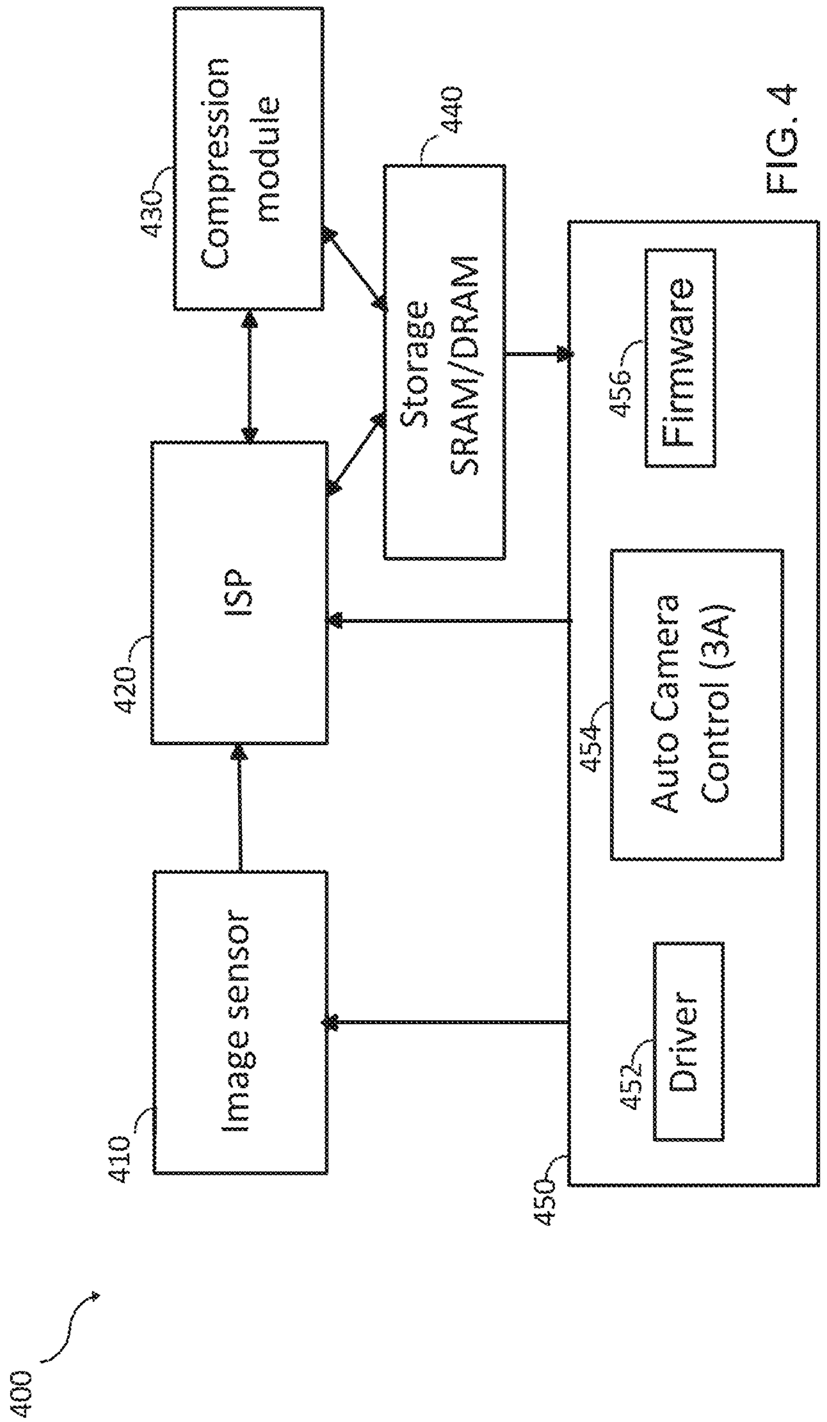
FIG. 4 is a block diagram of an image processing system according to an example.

FIG. 4 shows a block diagram of an image processing system 400 according to an example. The image sensor 410 typically includes an array of sensor pixels and may include any suitable photosensors for capturing light. In an example, each sensor pixel may include a photodiode to convert light incident upon it into electric signals. The sensor pixel may for example be a charge-couple device (CCD) or a complementary metal-oxide semiconductor (CMOS).

The controller 450 of FIG. 4 may include hardware, software or firmware components 456 configured to control features or characteristics of the image sensor 410. In another example, the firmware may be stored in the storage 440 (which can be accessed by the controller 450). The controller 450 of FIG. 4 also includes an auto camera control system 454, which may be configured to determine whether improvements to the image quality may need to be made by the image processing system 400. In an example, the auto camera control system 454 may include an auto exposure module, an auto white balance module and an auto focus module. The operation of the image sensor 410 may be controlled by the driver 452 also included in the controller 450.

In an example, the image signal processor (ISP) 420 may comprise circuitry configured to receive CFA image data comprising a plurality of pixel values from the image sensor 410 and generate output image data resulting from performing image processing operations. The image processing operations may require the use of storage module 440 to store and retrieve lines of image data when performing said image processing operations.

In an example, the storage module 440 may be on-chip memory or a buffer that may be accessed relatively quickly by the image signal processor 420, and may include at least one of volatile memory, such as a Random-Access Memory, static random-access memory (SRAM) or dynamic random-access memory (DRAM). The storage module may also include non-volatile memory, such as Read Only Memory (ROM) or a solid-state drive (SSD) such as Flash memory. After an image processing operation, the image data may be sent to the compression module 440 in order to be compressed so less storage space is required when undergoing further image processing operations in the image signal processor 420.

In some examples, the image sensor 410 may include a CFA comprising a plurality of color filters representable as a main two-dimensional row-columnar pattern, wherein a first color filter is arranged in at least a two-dimensional checkerboard sub-pattern in the main two-dimensional row-columnar pattern and a second color filter is arranged in a two-dimensional row-columnar sub-pattern in the main two-dimensional row-columnar pattern. In an example, the CFA may be that of a Bayer filter, wherein a first color filter may be a green color filter and a second color filter may be a red color filter. A third color filter to be included in the Bayer filter may be a blue color filter, also arranged in a two-dimensional row-columnar sub-pattern. As such, the Bayer filter pattern comprises a 2×2 repeating mosaic comprising of a red color filter element, a blue color filter element, and two green color filter elements along the diagonal of the mosaic. Other groups of differently colored filter elements are possible in other examples. An example of a method of processing image data from image sensor 410 with a CFA corresponding to a Bayer pattern is shown in FIG. 5.

Figure 5:
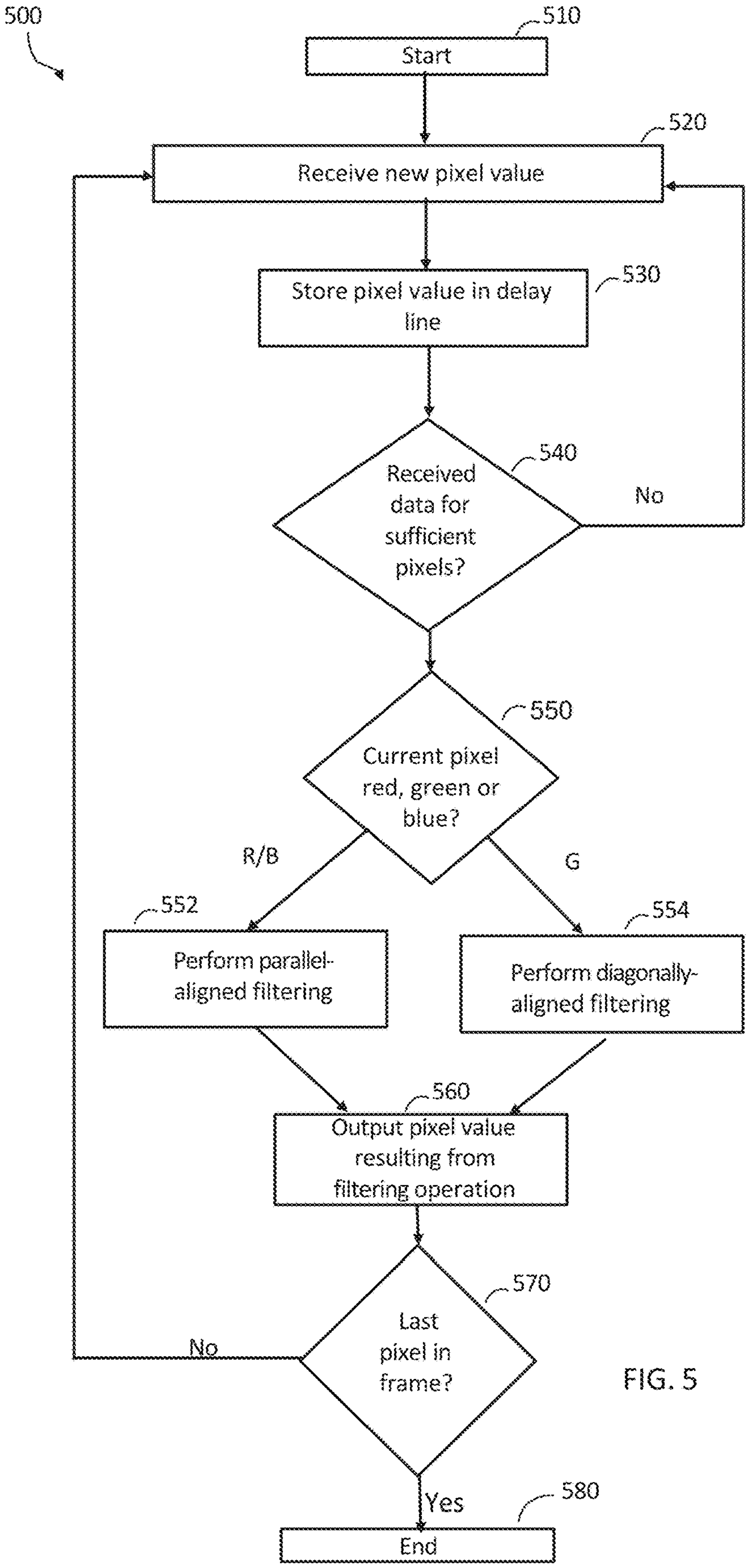
FIG. 5 is a flow diagram showing a method of processing Bayer filter image data according to an example.

FIG. 5 shows a flow chart 500 of a method of processing a raw frame of CFA image data comprising a plurality of pixel areas passed through a Bayer CFA, according to an example. At step 520, one pixel value from an image frame is received from the sensor, where the pixel value is associated with a filter color. At step 530, this pixel value is stored in a delay line.

Delay lines provide temporary storage for rows of pixel values previously read from the sensor, to allow for filtering operations to be carried out which require pixel values from previous rows. At step 540, if insufficient pixel values have been received in order to perform a filtering operation, then processing returns to step 520 in which a further pixel value is stored in the delay lines. A filtering operation involves use of an image processing kernel which is a small matrix of values. The filtering operation is performed by carrying out a convolution operation between the image processing kernel and the image data. The convolution operation involves adding together selected pixel values, each weighted by the values in the kernel. Different image processing kernels may be used for different image processing operations. In an example, an image processing kernel operable to perform a blurring operation may contain a larger central value compared to the surrounding values.

In examples, the color of the current pixel value being transformed by the filtering operation determines the way in which a filtering operation is performed. At step 550, if the current pixel value is red or blue, then at step 552 a parallel-aligned processing operation occurs on an array of respective red or blue pixel values. The filtering operation on respective red or blue pixel values is thus carried out on a square block of pixels which is unrotated such that its edges are parallel to the rows and columns of the main two-dimensional row-columnar pattern. The arrays of red or blue pixels values in the sub-pattern are thus arranged such that pixels in a given row of the sub-pattern are aligned to the same columns as the pixels in an adjacent row in the sub-pattern. However, if the current pixel value is green, a diagonally-aligned processing operation will be performed on an array of green pixel values, wherein the processing operation operates on the green pixel values in accordance with a reprojected array, the reprojected array corresponding to a reprojection of the two-dimensional checkerboard sub-pattern of green pixel values into a row-columnar array. In this example the reprojection of the two-dimensional checkerboard sub-pattern of green pixel values into a row-columnar array involves a rotation of +/−45 degrees, relative to the main two-dimensional row-columnar pattern of the CFA, shown at step 554. The reprojection comprises an array with primary axes rotated 45° relative to primary axes of the checkboard sub-pattern. The filtering operation is thus carried out on a square block of pixels which is rotated by +/−45 degrees such that its edges are diagonally-aligned with respect to the main two-dimensional row-columnar pattern. The reprojection forms a regular row-columnar pattern, such that pixels in a given row of the regular row-columnar pattern are aligned to the same columns as the pixels in an adjacent row of the regular row-columnar pattern. The resulting pixel value from the filtering operation is output at step 560. If at step 570 the most recently received pixel value is not the final pixel value in the frame of image data, the next pixel value is read out from the image sensor, otherwise the process ends at step 580.

Figure 6:
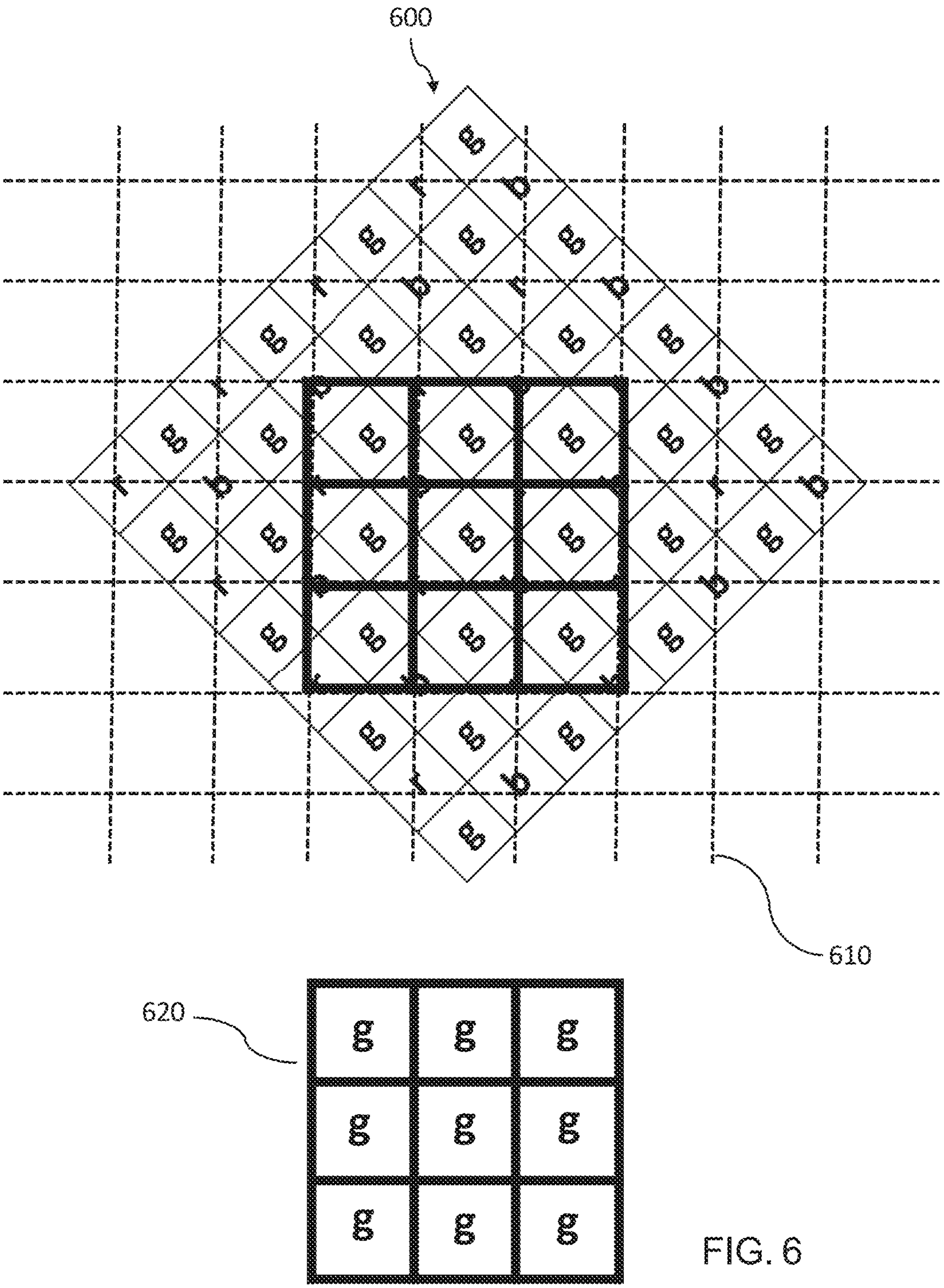
FIG. 6 is a representation of an array of green pixel values according to an example.

In an example, the CFA image data may be represented in a transformed co-ordinate system, where the vertical and horizontal axes of the transformed co-ordinate system align with the direction of the diagonally-aligned processing operation performed on first pixel values associated with a first filter color. A rotated Bayer pattern of image data 600 is shown in FIG. 6. Item 620 shows an array of green pixel values g, which is diagonally-aligned relative to the main Bayer pattern, to be selected when performing diagonally-aligned filtering operations. The filtering operation may be performed using a separable kernel. All the green pixel values in the array 620 may be operated on by a singular separable kernel, in contrast to the multiple separable kernels required to process both $g_1$ and $g_2$ green pixel values in the prior art shown in FIGS. 1 and 2.

In an example, this singular separable kernel may be configured to be decomposed into kernels operable to process the green pixel values in separate, mutually orthogonal directions.

Figure 7A:
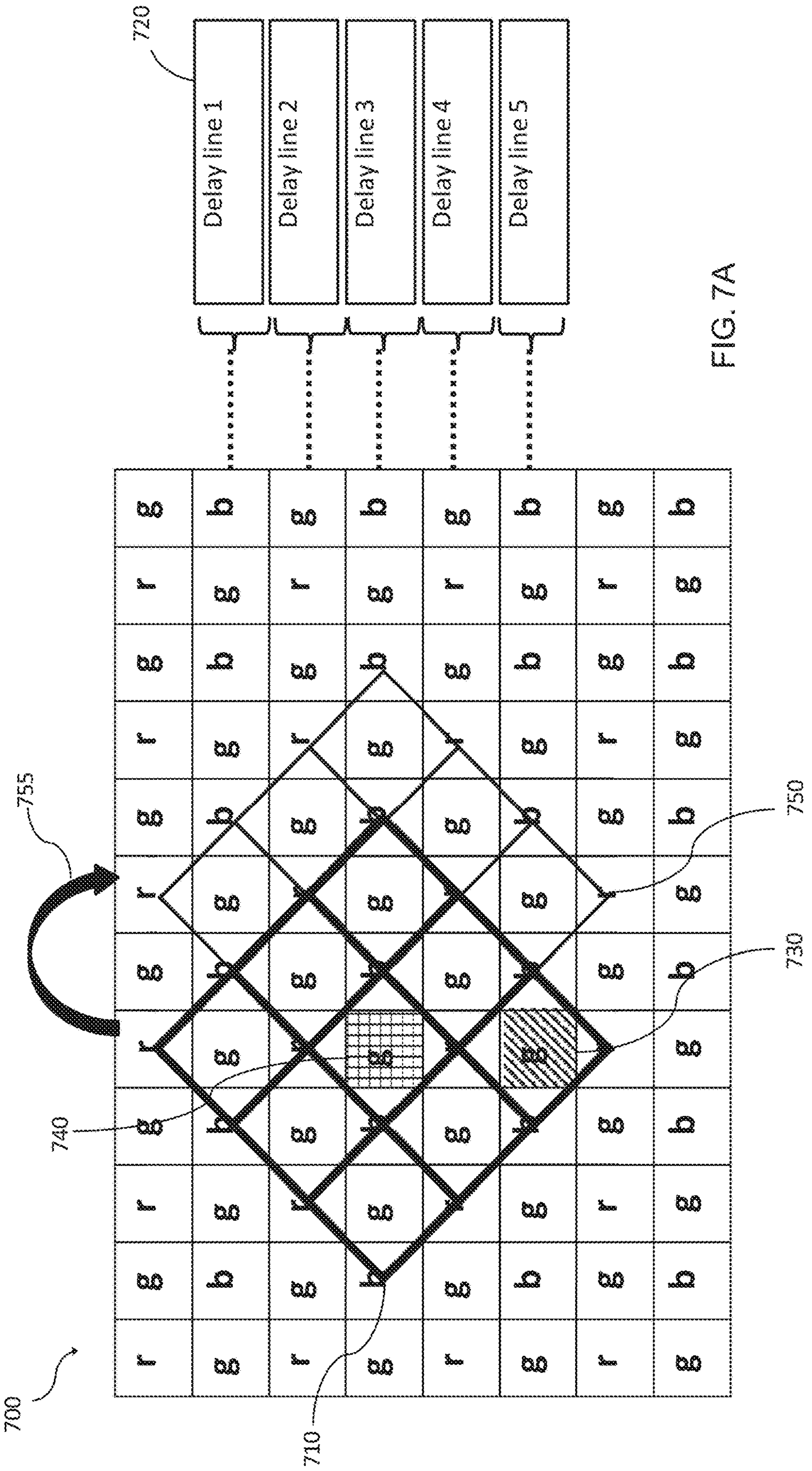
FIG. 7A is a representation of an array containing green pixel values and associated delay lines for Bayer filter data according to an example.

In an example, the CFA image data comprising a plurality of pixel values in a frame of image data may be operated on by a separable kernel performing a diagonally-aligned filtering operation on first pixel values associated with a first filter color. In an example where the CFA is a Bayer pattern, this operation is shown in FIG. 7A. In an example, FIG. 7A also shows the arrangement of delay lines 730 for storing pixel values of the Bayer image data in order to perform a filtering operation.

In the example shown in FIG. 7A, in the processing of Bayer pattern CFA image data 700, diagonally-aligned filtering operations are performed on a 3×3 diagonally-aligned array 710 of green pixel values g. These operations are carried out on the diagonally-aligned pixel values 710 selected such that the alignment of the array of pixel values is rotated at +45 degrees to the rows of the main two-dimensional row-columnar pattern of the Bayer filter data. Filtering is in this example performed using a 3×3 separable image processing kernel after delay lines 720 store the corresponding rows of pixels. The image processing kernel corresponding to the green pixel values in the diagonally-aligned array 710 is configured to perform a filtering operation on the green pixel values after the most recently produced green pixel value 730 is read in, and four full previous rows of pixel values and previously produced pixel values in the most recently produced part-row of pixel values are stored in the five delay lines 720, shown numbered as delay lines 1-5. The current pixel value 740 being transformed by the filtering operation is in the center of the diagonally-aligned array 710. A 3×3 image processing kernel operable to perform filtering operations on all the green values in the array 710 is a separable kernel which may be decomposed into a 1×3 image processing kernel and a 3×1 image processing kernel allowing for a reduction in computational cost when performing said filtering operations. The filtering operation is thus carried out on a square block of pixels which is rotated by +/−45 degrees such that its edges are diagonally-aligned with respect to the main two-dimensional row-columnar pattern. The next diagonally-aligned array 750 of green pixel values to be used in the filtering operation is horizontally spaced by two pixels relative to diagonally-aligned array 710. Arrow 755 indicates the progression of the image processing kernel to perform the next set of filtering operations on the green pixel values g, which occurs after a filtering operation on a parallel-aligned array of blue pixel values as described below in relation to FIG. 7B. Whilst the green pixel operations are in this example performed on 3×3 pixel value arrays, other sizes of filtering operations may be performed, for example on 5×5 pixel value arrays or 7×7 pixel value arrays.

Figure 7B:
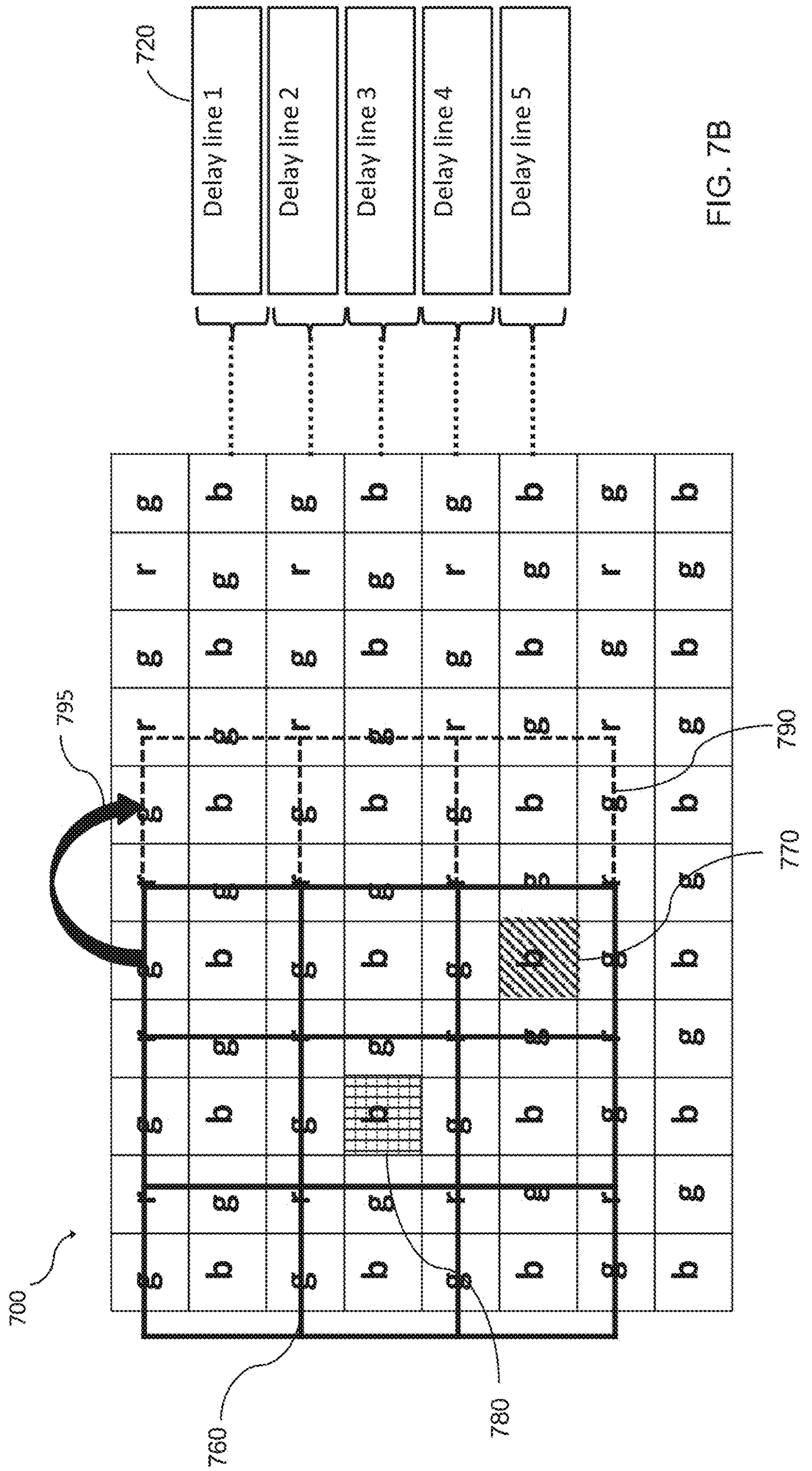
FIG. 7B is a representation of an array containing blue pixel values and associated delay lines for Bayer filter data according to an example.

In the example shown in FIG. 7B, in the processing of Bayer pattern CFA image data 700, parallel-aligned processing operations are performed on an array 760 of blue pixel values. These operations are performed in this example on a 3×3 pixel value array 760. The image processing kernel corresponding to the blue pixel values in parallel-aligned array 760 is configured to perform a filtering operation on the blue pixel values after the most recently produced blue pixel value 770 is read in, and four full previous rows of pixel values and previously produced pixel values in the most recently produced part-row of pixel values are stored in the five delay lines 720. The current pixel value 780 being transformed by the filtering operation is in the center of the parallel-aligned array 760 which is operated on by a separable image processing kernel which may be decomposed into a 1×3 image processing kernel and a 3×1 image processing kernel to produce a transformed blue pixel value. The filtering operation on respective red or blue pixel values is thus carried out on a square block of pixels which is unrotated such that its edges are parallel to the rows and columns of the main two-dimensional row-columnar pattern. The next parallel-aligned array 790 of blue pixel values to be used in the filtering operation is horizontally spaced by two pixels relative to parallel-aligned array 760. Arrow 795 indicates the progression of the image processing kernel to perform the next filtering operation on the blue pixel values b, which occurs after a filtering operation on the next diagonally-aligned array 750 of green pixel values as described above in relation to FIG. 7A. Whilst the blue pixel operations are in this example performed on 3×3 pixel value arrays, other sizes of filtering operations may be performed, for example on 5×5 pixel value arrays or 7×7 pixel value arrays. Whilst not illustrated, similar operations may be performed on parallel-aligned arrays of red pixel values.

In an example, the diagonally-aligned processing operations on the green pixel values have an increased sampling frequency with a spatial sampling rate of $\sqrt{2}$ compared to the spatial sampling rate of 2 of the two separate green channels $g_1$ and $g_2$ in the prior art shown in FIGS. 1 and 2. This increased sampling frequency of the green pixel values may allow for a reduction in aliasing, and an improvement in image quality. Aliasing is a visual phenomenon which occurs in digital imaging where due to using a sampling frequency below the Nyquist rate, defined as twice the highest frequency in the image, jagged edges appear after the image is processed.

In an example, rather than performing filtering, the diagonally-aligned processing operations may be transformations on a whole frame of image data. Such transformations may be frequency transformations on the green pixel values, including discrete Fourier transformations (DFT), discrete cosine transformations (DCT), or discrete wavelet transformations (DWT). As frequency transformations rely on the variations in intensity between pixels, by being able to process the green pixel values for the whole frame of image data, instead of processing the green pixel values in two separate green channels, higher spatial frequencies of green channel data may be analyzed.

Figure 8A:
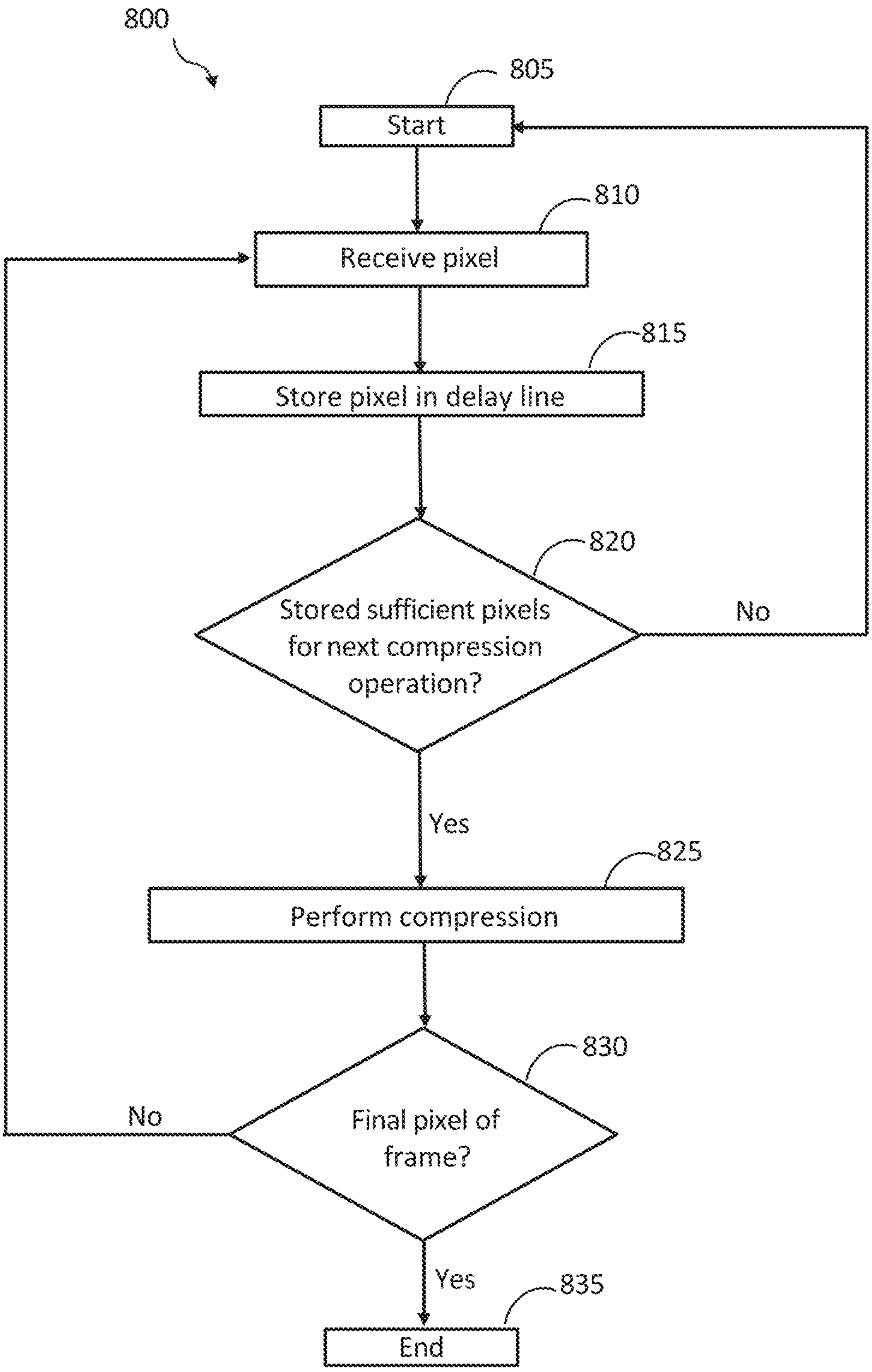
FIG. 8A is a flow diagram showing a method of performing a compression operation on CFA image data according to an example.

FIG. 8A shows a method 800 of compressing CFA image data. These may for example be the steps with which the compression/decompression module 430 in FIG. 4 compresses CFA image data in between image processing operations in the image signal processor pipeline 300. In this example the CFA image data is Bayer pattern image data. In example, a type of compression to be used may be JPEG compression. JPEG compression requires the use of a Discrete Cosine Transform (DCT) to be applied to the image data, where the data is split up into blocks of 8×8 pixels and compared to a DCT matrix of cosines to extract weights representing the frequency information of the image data.

At item 810, one pixel from an image frame is received from the sensor and at step 815, this pixel is stored in a delay line. At step 820, if insufficient pixel values of a first color, for example green pixel values have been received in order to perform a compression operation, then processing returns to step 805 so a further pixel value may be stored in the delay lines. Once sufficient green pixels have been stored, a compression operation occurs at step 825. The compression operation 825 involves performing a diagonally-aligned processing operation on the green pixel values, wherein the processing operation operates on the green pixel values in accordance with a reprojected array, the reprojected array corresponding to a reprojection of the two-dimensional checkerboard sub-pattern into a row-columnar array.

If at step 830 the most recently received pixel is not the final pixel in the frame of image data, the next pixel is read out from the image sensor at step 810, otherwise the process ends at step 835.

In an example, CFA image data compression and decompression may be performed on reprojected arrays in the form of square pixel value blocks corresponding to pixel values of a first color, for example green pixel values. Image data compression and decompression may occur on square pixel value blocks which involves a diagonally-aligned processing operation, in this case a rotation of 45 degrees, with respect to the row-columnar directions of the main two-dimensional row-columnar pattern of the CFA image data. In an example, this CFA may be a Bayer pattern, wherein the first pixel value corresponds to green pixel values. In another example, CFA image data compression and decompression may be performed on pixel value blocks corresponding to pixel values of a second color, where compression and decompression may occur on square blocks of a second pixel color value non-rotated relative to the row-columnar directions of the main two-dimensional row-columnar pattern. In the example where the CFA is a Bayer pattern, the square blocks of a second pixel color correspond to red or blue pixel values.

In an example, the method 800 for compressing image data is not limited to DCT compression and can be used on many different types of both lossy and lossless compression methods including DWT compression, color quantization, chroma subsampling, fractal compression, run-length encoding, DEFLATE and any other compression methods which utilize blocks of pixels.

Figure 8B:
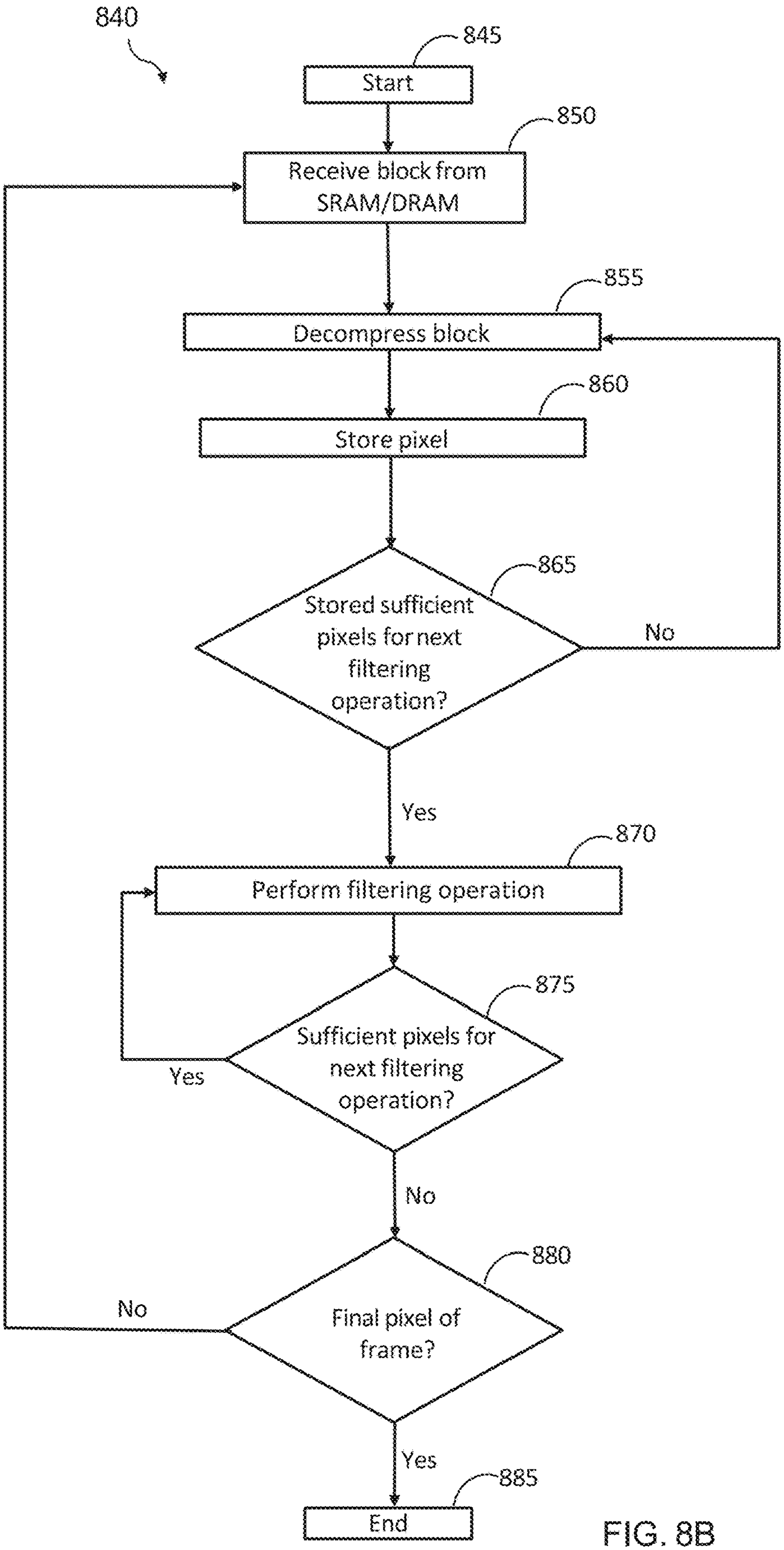
FIG. 8B is a flow diagram showing a method of performing a decompression operation on CFA image data according to an example.

FIG. 8B shows a method 840 of decompressing CFA image data. These may for example be the steps with which the compression/decompression module 430 in FIG. 4 decompresses CFA image data in between filtering operations in the image signal processor pipeline 300.

At item 850, a block of compressed data may be received from the SRAM/DRAM of the storage module 440 of FIG. 4. At step 855, this block of compressed data may undergo a decompression operation. The decompression operation 855 involves performing a diagonally-aligned processing operation on the green pixel values, wherein the processing operation operates on the green pixel values in accordance with a reprojected array, the reprojected array corresponding to a reprojection of the two-dimensional checkerboard sub-pattern into a row-columnar array.

At step 860, an output pixel is stored in a delay line. At step 865, if insufficient output pixels from the decompression operation have been stored in the delay lines in order to perform a filtering operation, then processing returns to step 855. If sufficient pixels have been stored after the decompression operation, the next filtering operation is performed at step 870. At step 875, if there are sufficient pixels for the next filtering operation in the image processing pipeline, step 870 is repeated. However, if the next filtering operation in the image processing pipeline requires more pixels, and if the most recently received pixel is not the final pixel of the frame of image data at step 880, a new block of compressed data is received from the SRAM/DRAM to be decompressed at step 855. If the final pixel in the frame of image data has been received, then the process 840 ends at step 885.

Figure 9:
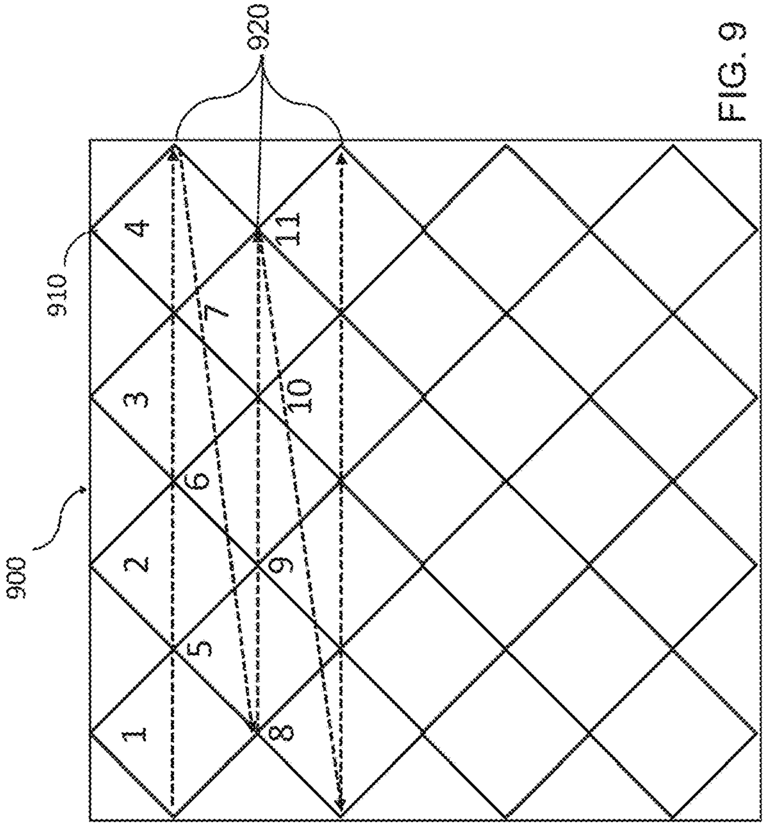
FIG. 9 is a schematic showing a processing order of blocks of image data sequentially in a linear path according to an example.

A schematic representation of a compression and decompression method for a single color channel of a frame of CFA image data is shown in FIG. 9. In this method, pixel value blocks 910 are diagonally-aligned relative to the original frame of image data, allowing a checkerboard pattern of the single color channel to be operated on in accordance with a reprojected array, rotated to form a regular row-columnar pattern in each block, which can be processed using known compression and decompression techniques, which are applied to such regular row-columnar patterns. The pixels in the regular row-columnar pattern are arranged such that pixels in a given row of the regular row-columnar pattern are aligned to the same columns as the pixels in an adjacent row of the regular row-columnar pattern.

In this example, pixel value blocks 910 are rotated by 45 degrees relative to the row-columnar directions of the main two-dimensional row-columnar pattern of the frame of CFA image data. In the case where the CFA is that of a Bayer pattern, the blocks of pixels to be rotated correspond to blocks comprising green pixel values. In this case, a diagonally-aligned blockwise image compression and decompression is performed on the rotated blocks of green pixel values, where the processing operation may be performed in a linear path across the frame, blanking, and then moving in a linear path across the next line, shown at item 920 of FIG. 9.

Figure 10:
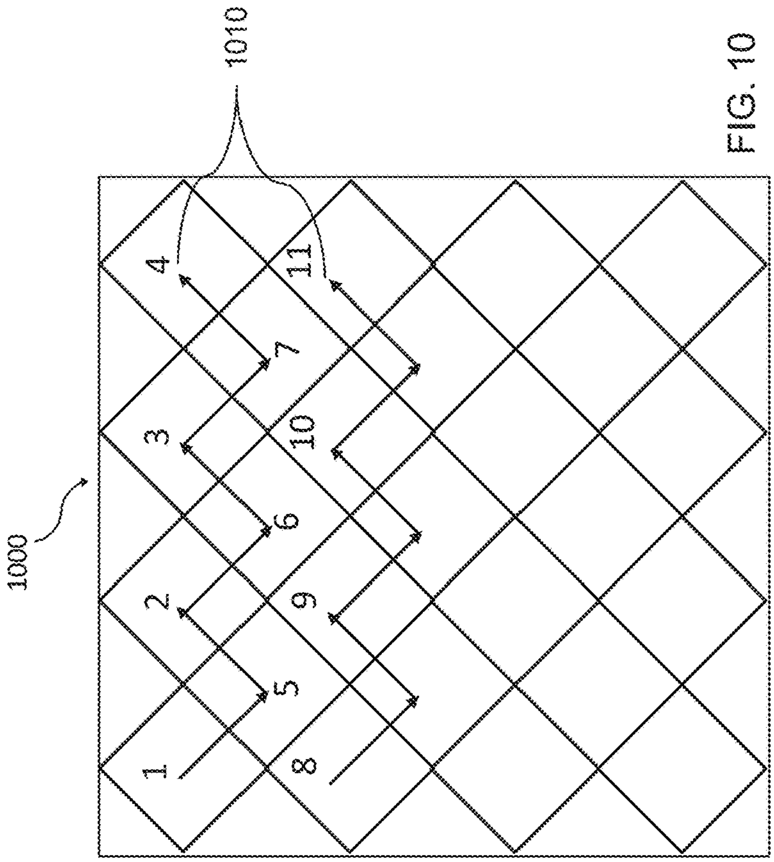
FIG. 10 is a schematic showing a processing order of blocks of image data sequentially in a zig-zag path according to an example.

In an example, blocks of pixels of a first color may be processed sequentially in a zig-zag path. This is shown in FIG. 10, where two rows of blocks traversed using a zig-zag path, shown at item 1010, process the same number of blocks as in FIG. 9, where three rows of blocks are required instead. The reduction in the number of rows of blocks undergoing the processing operation allows for a reduction in the number of blanking intervals, and therefore a reduction in blanking time, allowing for the compression operation to occur faster than if using the traditional raster scan method shown in FIG. 9.

In an example, blocks of pixels of a second color value may be non-rotated relative to the row-columnar directions of the main two-dimensional row-columnar pattern. In the case where the CFA is that of a Bayer pattern, the non-rotated blocks correspond to blocks comprising red and blue pixel values. In this case, a parallel-edged blockwise processing operation is performed on the red and blue blocks of pixel values, whereby the red and blue pixel value blocks are compressed sequentially in a linear path across the frame. The blue channel and the red channel are already in a regular row-columnar pattern and may be subject to blockwise compression and decompression without rotation.

Figure 11:
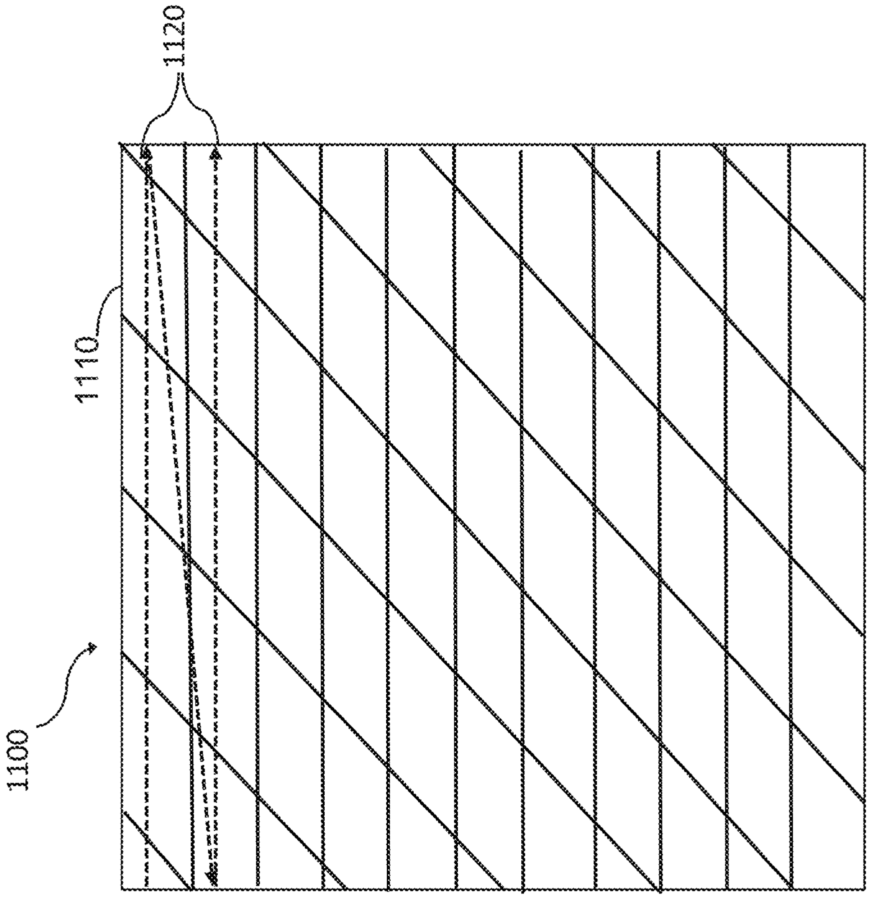
FIG. 11 is a schematic showing a processing order of parallelogram-shaped blocks of image data according to an example.

In another example, FIG. 11 shows a method 1100 of performing a compression and/or decompression operation on pixel blocks 1110. In an example, the CFA image data is a Bayer pattern, and the blocks of pixels of a first color are blocks of green pixel values. In this example, the green pixel values are processed in parallelogram-shaped blocks with one pair of edges aligned 45 degrees relative to the row-columnar directions of the main two-dimensional row-columnar pattern. Hence the pixel value blocks are diagonally-aligned relative to the original frame of image data. The other pair of edges of the blocks are parallel-aligned with one of the row-columnar directions. The compression and/or decompression operation thus involves performing a diagonally-aligned processing operation on the green pixel values, wherein the processing operation operates on the green pixel values in accordance with a reprojected array, the reprojected array corresponding to a reprojection of the two-dimensional checkerboard sub-pattern into a row-columnar array. This green data channel can be transformed into a regular row-columnar pattern, using this axis transformation.

These non-orthogonal pixel block axes allow for the pixel blocks to be processed in raster-scan order, ensuring only two rows 1120 of compressed data blocks can be processed in order to retrieve a complete line of CFA image data as compared to the method of FIG. 9 where three rows of compressed data blocks are processed. Again, the blue channel and the red channel are already in a regular row-columnar pattern and may be subject to blockwise compression and decompression without axis transformation.

Figure 12B:
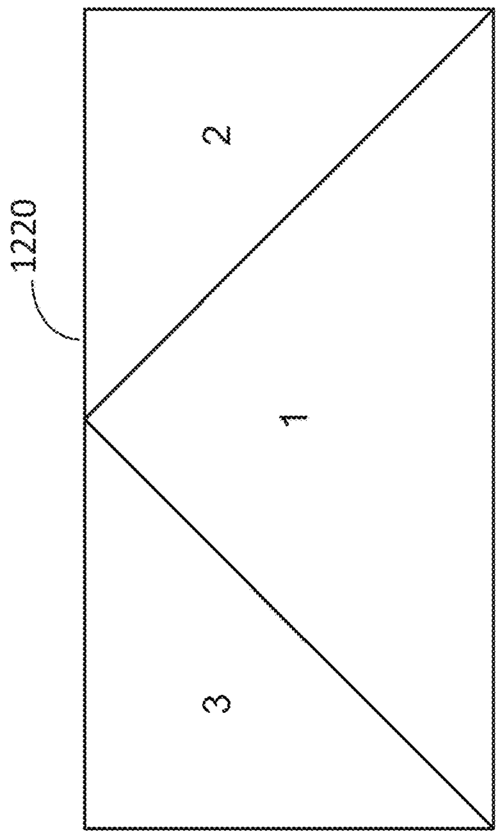
FIG. 12B is a schematic showing a re-arrangement of a frame of image data according to an example.
Figure 12A:
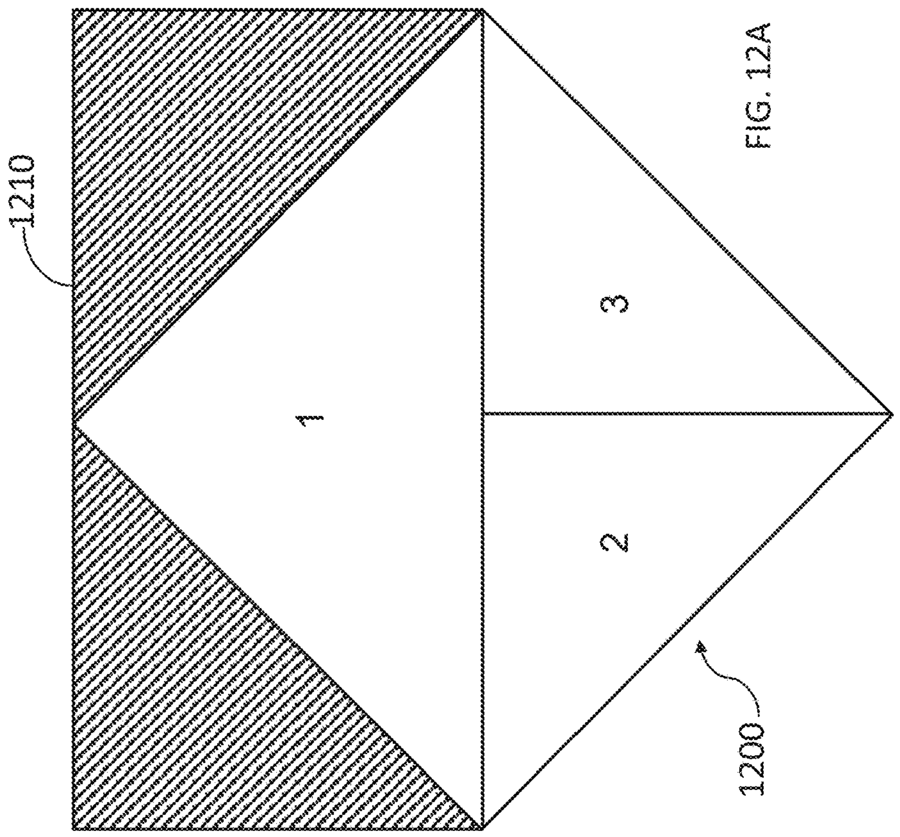
FIG. 12A is a schematic showing a rotation in relation to a frame of image data according to an example.

In another example, compression may be performed on the entire rotated frame 1200 of single color channel image data, shown in FIG. 12, where the rotated frame of single color channel image data is transformed to a rectangular frame 1210. Rectangular frame 1220 of FIG. 12B shows the re-arrangement of this frame of data. The rotated frame 1200 is partitioned into three blocks, each of which is diagonally-aligned relative to the original frame of image data. In an example, if the CFA image data is a Bayer pattern, the blocks of pixels of a first color are blocks of green pixel values. This green data channel can be transformed into a regular row-columnar pattern, using this blockwise transformation, allowing the re-arranged frame of single-color image data to be processed using known compression and decompression techniques which are applied to such regular row-columnar patterns. Other re-arrangements and variations in the partitioning of the green channel of image data into diagonally-aligned blocks are possible. Again, the blue channel and the red channel are already in a regular row-columnar pattern and may be subject to blockwise compression and decompression without re-arrangement.

The order of processing steps in the examples described above are merely exemplary. In other examples, these processing steps may be performed in a different order.

In the above-described examples, the main two-dimensional row-columnar pattern is the Bayer pattern. However, it should be appreciated that other filter arrangements may be used where there is a repeating color filter along the diagonal such as Red, Yellow, Yellow, Cyan (RYYCy), Cyan, Yellow, Yellow, Magenta (CYYM) or Red, Clear, Clear, Clear (RCCC) filter arrangements. Similarly 4×4 CFAs such as 4×4 RGB-Ir filter arrays may be used.

It is to be understood that any feature described in relation to any one example may be used alone, or in combination with other features described, and may also be used in combination with one or more features of any other examples, or any combination of any other examples. Furthermore, equivalents and modifications not described above may also be employed without departing from the scope of the accompanying claims.

What is claimed is:

1. A method of processing color filter array, CFA, image data, the method comprising performing image processing in an image processing pipeline comprising a plurality of stages, the method comprising:

receiving CFA image data comprising a plurality of pixel values in a frame of image data representable as a main two-dimensional row-columnar pattern, each pixel value corresponding to a color filter in a CFA, wherein different pixel values of the plurality of pixel values are associated with respective different filter colors including first pixel values associated with a first filter color and second pixel values associated with a second filter color, wherein:

the first pixel values are arranged in at least a two-dimensional checkerboard sub-pattern in the main two-dimensional row-columnar pattern;

performing, in one stage of the image processing pipeline, a diagonally-aligned processing operation on the first pixel values, wherein the processing operation operates on the first pixel values in accordance with a reprojected array, the reprojected array corresponding to a reprojection of the two-dimensional checkerboard sub-pattern into a row-columnar array; and generating output image data resulting from performing said diagonally-aligned image processing operation on the first pixel values, the output image data comprising first output pixel values, performing, in a subsequent stage of the image processing pipeline, a further, different, diagonally-aligned processing operation on the first output pixel values in accordance with a reprojected array, the reprojected array corresponding to a reprojection of the two-dimensional checkerboard sub-pattern into a row-columnar array; and generating second output pixel values resulting from performing said further diagonally-aligned image processing operation on the first pixel values.

2. The method of processing CFA image data according to claim 1, wherein the second pixel values are arranged in a two-dimensional row-columnar sub-pattern in the main two-dimensional row-columnar pattern, the method comprising:

performing a parallel-aligned processing operation on the second pixel values, wherein the parallel-aligned processing operation operates on the second pixel values in the alignment in which they are arranged in the two-dimensional row-columnar sub-pattern; and generating output image data resulting from performing said parallel-aligned image processing operation on the second pixel values.

3. The method of processing CFA image data according to claim 1, wherein the diagonally-aligned processing operation comprises a filtering operation.

4. The method of processing CFA image data according to claim 3, wherein the filtering is performed using a separable kernel.

5. The method of processing CFA image data according to claim 4, wherein the separable kernel is configured to be decomposed into kernels operable to process the first pixel values in separate, mutually-orthogonal directions.

6. The method of processing CFA image data according to claim 3, wherein the filtering comprises a filtering operation of a denoising type, a sharpening type, a blurring type, an interpolation type or an edge detection type.

7. The method of processing CFA image data according to claim 2, wherein:

the diagonally-aligned processing operation comprises a first filtering operation and the parallel-aligned processing operation comprises a second filtering operation, and wherein the first and second filtering operations are of a corresponding type.

8. The method of processing CFA image data according to claim 7, wherein the first and second filtering operations are one of a denoising type, a sharpening type, a blurring type, an interpolation type or an edge detection type.

9. The method of processing CFA image data according to claim 1, wherein the first pixel values are a square array of pixel values rotated by 45 degrees relative to the row-columnar directions of main two-dimensional row-columnar pattern.

10. The method of processing CFA image data according to claim 2, wherein:

the first pixel values are a square array of pixel values rotated by 45 degrees relative to the row-columnar directions of the main two-dimensional row-columnar pattern; and the second pixel values are a square array of pixel values non-rotated relative to the row-columnar directions of the main two-dimensional row-columnar pattern.

11. The method of processing CFA image data according to claim 1, wherein said diagonally-aligned processing operation comprises image compression.

12. The method of processing CFA image data according to claim 11, wherein the image compression is performed in a blockwise manner wherein blocks of a first pixel value are processed sequentially in a zig-zag path across at least part of the frame.

13. The method of processing CFA image data according to claim 2, wherein said diagonally-aligned processing operation and said parallel-aligned processing operation each comprise image compression.

14. The method of processing CFA image data according to claim 13, wherein the diagonally-aligned processing operation is performed on first pixel value blocks comprising the first pixel values, wherein the parallel-aligned processing operation is performed on second pixel value blocks comprising the second pixel values, and wherein the image compression comprises:

for the diagonally-aligned blockwise-processing operation, processing of at least some of the first pixel value blocks sequentially in a zig-zag path across at least part of the frame; and for the parallel-aligned processing operation, processing of at least some of the second pixel value blocks sequentially in a linear path across at least part of the frame.

15. The method of processing CFA image data according to claim 11, wherein the diagonally aligned processing operation is performed on first pixel value blocks comprising the first pixel values, and wherein:

the first pixel value blocks are parallelogram-shaped blocks with one pair of edges aligned 45 degrees relative to the row-columnar directions of the main two-dimensional row-columnar pattern and another pair of edges aligned with one of the row-columnar directions.

16. The method of processing CFA image data according to claim 13, wherein the diagonally-aligned processing operation is performed on first pixel value blocks comprising the first pixel values, wherein the parallel-aligned processing operation is performed on second pixel value blocks comprising the second pixel values, and wherein:

the first pixel value blocks are parallelogram-shaped blocks with one pair of edges aligned 45 degrees relative to the row-columnar directions of the main two-dimensional row-columnar pattern and another pair of edges aligned with one of the row-columnar directions; and the second pixel value blocks are square blocks aligned with the row-columnar directions of the main two-dimensional row-columnar pattern.

17. The method of processing CFA image data according to claim 11, wherein the image compression comprises DCT compression, DWT compression, color quantization, chroma subsampling, fractal compression, run-length encoding and/or DEFLATE compression.

18. An image signal processor comprising circuitry configured to perform a method comprising performing image processing in an image processing pipeline comprising a plurality of stages, the method comprising:

receiving color filter array, CFA, image data comprising a plurality of pixel values in a frame of image data representable as a main two-dimensional row-columnar pattern, each pixel value corresponding to a color filter in a CFA, wherein different pixel values of the plurality of pixel values are associated with respective different filter colors including first pixel values associated with a first filter color and second pixel values associated with a second filter color, wherein:

the first pixel values are arranged in at least a two-dimensional checkerboard sub-pattern in the main two-dimensional row-columnar pattern;

performing, in one stage of the image processing pipeline, a diagonally-aligned processing operation on the first pixel values, wherein the processing operation operates on the first pixel values in accordance with a reprojected array, the reprojected array corresponding to a reprojection of the two-dimensional checkerboard sub-pattern into a row-columnar array;

generating output image data resulting from performing said diagonally-aligned image processing operation on the first pixel values, the output image data comprising first output pixel values, performing, in a subsequent stage of the image processing pipeline, a further, different, diagonally-aligned processing operation on the first output pixel values in accordance with a reprojected array, the reprojected array corresponding to a reprojection of the two-dimensional checkerboard sub-pattern into a row-columnar array; and generating second output pixel values resulting from performing said further diagonally-aligned image processing operation on the first pixel values.

19. An imaging system comprising:

an image sensor; and an image signal processor comprising circuitry configured to perform a method comprising performing image processing in an image processing pipeline comprising a plurality of stages, the method comprising:

receiving color filter array, CFA, image data from the image sensor, the CFA image data comprising a plurality of pixel values in a frame of image data representable as a main two-dimensional row-columnar pattern, each pixel value corresponding to a color filter in a CFA, wherein different pixel values of the plurality of pixel values are associated with respective different filter colors including first pixel values associated with a first filter color and second pixel values associated with a second filter color, wherein:

the first pixel values are arranged in at least a two-dimensional checkerboard sub-pattern in the main two-dimensional row-columnar pattern;

performing, in one stage of the image processing pipeline, a diagonally-aligned processing operation on the first pixel values, wherein the processing operation operates on the first pixel values in accordance with a reprojected array, the reprojected array corresponding to a reprojection of the two-dimensional checkerboard sub-pattern into a row-columnar array;

generating output image data resulting from performing said diagonally-aligned image processing operation on the first pixel values, the output image data comprising first output pixel values, performing, in a subsequent stage of the image processing pipeline, a further different diagonally-aligned processing operation on the first output pixel values in accordance with a reprojected array, the reprojected array corresponding to a reprojection of the two-dimensional checkerboard sub-pattern into a row-columnar array, and generating second output pixel values resulting from performing said further diagonally-aligned image processing operation on the first pixel values.

* * * * *